UNITED STATES PATENT OFFICE.

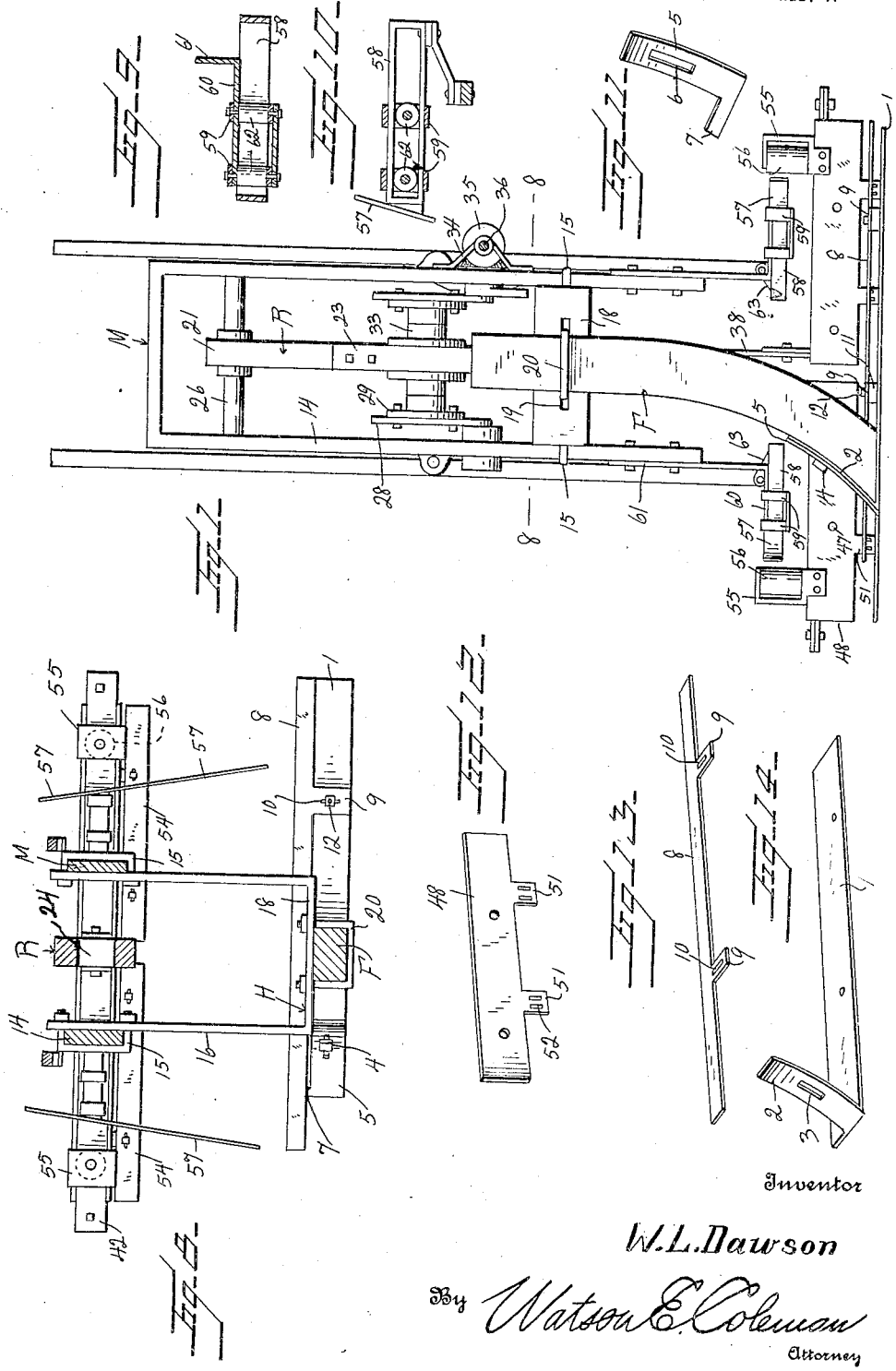

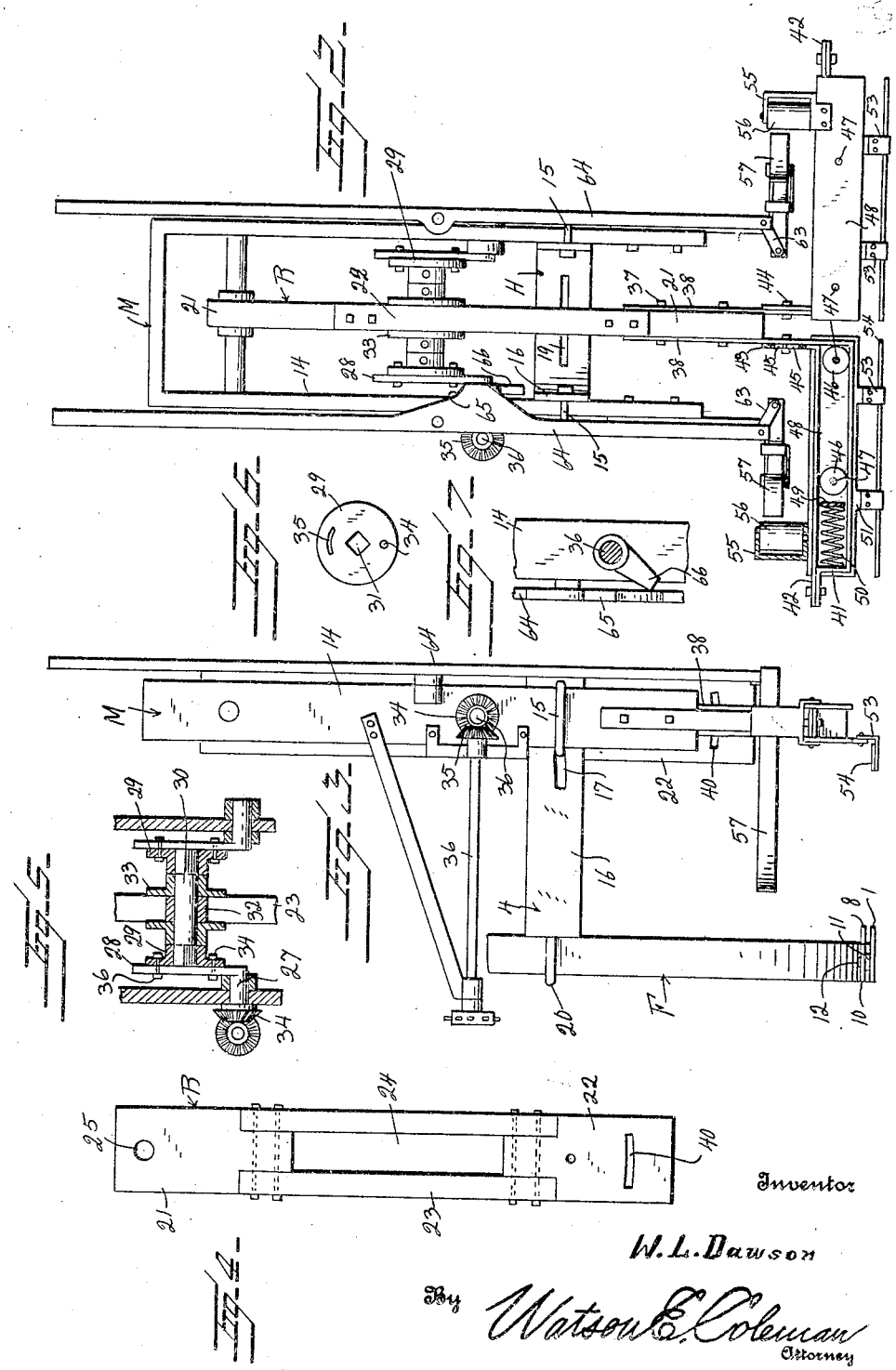

WILLIAM L. DAWSON, OF HUMBLE, TEXAS.

COTTON-CHOPPER.

1,354,958.	Specification of Letters Patent.	Patented Oct. 5, 1920.

Application filed February 5, 1919, Serial No. 275,176. Renewed April 3, 1920. Serial No. 371,143.

*To all whom it may concern:*

Be it known that I, WILLIAM L. DAWSON, a citizen of the United States, residing at Humble, in the county of Harris and State of Texas, have invented certain new and useful Improvements in Cotton-Choppers, of which the following is a specification, reference being had to the accompanying drawings.

This invention relates to certain improvements in cotton choppers, and it is an object of the invention to provide a novel and improved device of this general character which may be readily and conveniently engaged with a foot or other part of a cultivator, and wherein cutting means are employed, operated from a movable part of the cultivator or the like.

It is also an object of the invention to provide a novel and improved device of this general character comprising two relatively movable cutting members, and wherein one of said cutting members is capable of adjustment in a direction along the path of travel of the device so that the cutting action of the members may be controlled.

It is also an object of the invention to provide a novel and improved cotton chopper comprising two relatively movable cutting members together with automatically operated means for imparting movement to one of said members along the path of travel of the device, so that the plant or stand will not be pulled from the ground as the device advances during a cutting or chopping operation.

It is also an object of the invention to provide a novel and improved cotton chopper wherein various parts thereof are adjustable so that the device may be assembled in a manner to operate to the best advantage as the occasions of practice may necessitate.

An additional object of the invention is to provide a novel and improved device of this general character comprising two relatively movable cutting members, one of said members being substantially stationary relative to the other, and the second member being supported for oscillation in a direction substantially at right angles to the path of travel of the device.

Another object of the invention is to provide a novel and improved device of this general character including coacting chopper members together with a fender or scraper coacting with the forward end portion of one of said members to facilitate the advance of said cutting member.

The invention consists in the details of construction and in the combination and arrangement of the several parts of my improved cotton chopper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in inner side elevation of a cotton chopper constructed in accordance with an embodiment of my invention and applied to the shank of a cultivator, the cultivator proper being omitted for clarity of disclosure;

Fig. 2 is a view in outer side elevation of the device as disclosed in Fig. 1 with portions broken away and the cultivator foot and the parts carried thereby omitted;

Fig. 3 is a view in rear elevation of the device as disclosed in Fig. 1;

Fig. 4 is an enlarged elevational view of the rocking member as herein disclosed, and which carries certain of the cutting or chopping members;

Fig. 5 is a fragmentary view partly in vertical section and partly in elevation illustrating the means for operating the rocking member;

Fig. 6 is a view in elevation of one of the bearings included in the means particularly illustrated in Fig. 5;

Fig. 7 is an enlarged fragmentary view partly in elevation and partly in section illustrating the trip for automatically imparting swinging movement in one direction to one of the cutting or chopping members carried by the rocking member;

Fig. 8 is a horizontal sectional view taken substantially on the line 8—8 of Fig. 1;

Fig. 9 is a longitudinal vertical sectional view taken through the spring carrying slide and its support as herein included;

Fig. 10 is a view partly in top plan and partly in section of the structure illustrated in Fig. 9, with the co-acting spring shown in fragment;

Fig. 11 is a view in perspective of the fender or guard carried by the cultivator foot or the like, detached;

Fig. 12 is a view in perspective of the rear plate or wall supporting the endwise movable cutting member or blade;

Fig. 13 is a view in perspective of the substantially stationary cutting member or blade; and Fig. 14 is a view in perspective of the slide engaged with the cultivator foot or the like, and which supports the substantially stationary cutting member.

As disclosed in the accompanying drawings, F denotes the foot of a cultivator of any ordinary or preferred type, and underlying the lower end of said foot F is an elongated and rearwardly directed drag or slide 1 which is adapted to substantially contact with the ground surface. The forward end portion of the slide or drag 1 is provided with an upstanding arm or extension 2 provided with a longitudinally disposed slot 3 through which an anchoring bolt 4 or the like is directed to secure said arm or extension 2 to the foot F for maintaining the drag or slide 1 in applied position relative to the foot F.

5 denotes a fender or scraper which overlies the arm or extension 2 and is provided with a longitudinally disposed slot 6 through which the bolt 4 or the like is also directed for maintaining the fender or scraper 5 in applied position. The lower end portion of the fender or scraper 5 is provided with a laterally directed extension 7 which extends outwardly of the foot F and which operates to clear a path of clods or the like as the device advances.

The slot 3 of the extension or arm 2 permits the drag or slide 1 to be raised or lowered as the occasions of practice may require, and the slot 6 of the fender or drag 5 permits a similar adjustment of this member.

8 denotes an elongated cutting member having a comparatively dull cutting edge, and which is provided with a pair of rearwardly directed extensions 9. The extensions 9 have disposed therethrough the longitudinally directed slots 10. The member 8 is of a length to extend from the rear end of the slide or drag 1 to a point in close proximity thereof, and said member 8 overlies the outer longitudinal marginal portion of said drag or slide with the similar edges substantially in vertical alinement. Interposed between the extensions 9 of the member 8 and the slide or drag 1 are the spacing blocks 11, and directed through the slots 10 and the blocks 11 and drag or slide 1 are the clamping or holding bolts 12. Through the medium of the slots 10 it will be at once self evident that the member 8 may be adjusted laterally of the slide or drag 1 as best meets the requirements of practice.

M denotes a main frame preferably in the form of an inverted U and substantially vertically disposed when in applied position. The side arms 14 of said member at the lower end portions thereof have engaged therewith the clamping members 15 which also coact with the side members 16 of the substantially horizontally disposed holding frame H. Each of the clamping members 15 are disposed through a longitudinally disposed slot 17 in the side arms 14 so that the member H may be longitudinally adjusted relative to the main frame M. It will also be understood that the clamps 15 permit the holding frame H to be adjusted longitudinally of the frame M.

The intermediate portion 18 of the frame H is provided with a longitudinally disposed slot 19 through which is directed the clamping member 20 which engages the upper portion of the cultivator foot F so that the member H is effectively secured to said foot for maintaining the frame M in desired position. It will be understood that the clamp 20 permits the frame H to be adjusted longitudinally of foot F.

R denotes a rocking member herein disclosed as comprising an upper head 21 and a lower head 22 connected by the side bars 23. The side bars 23 are spaced one from the other to produce therebetween a slot 24. The upper head 21 is provided with an opening 25 through which is directed a supporting rod or member 26 supported by and connecting the side arms 14 of the member M adjacent the tops thereof. The rod or member 26 serves as a fulcrum for the member R.

Each of the side arms 14 of the member R below the rod or member 26 has rotatably supported thereby a stub shaft 27 provided at its inner end with a rocking arm 28. The rock arms 28 of both of the shafts 27 extend in the same general direction and are arranged in parallelism, and the opposed faces of said arms 28 have secured thereto the bearings 29 in which are engaged the opposite end portions of the connecting pin 30. The extremities of the pin 30 are angular in cross section and are engaged within a correspondingly formed opening 31 in the bearings 29 so that said pin 30 is held against rotation. The pin 30 is disposed through the slot 24 of the member R and loosely mounted on said pin 30 for contact with the walls of the slot 24 is a sleeve 32. Fixed to the pin 30 at opposite sides of the sleeve 32 and the member R are the collars 33 which overlie the opposite sides of the member R and to assure the proper coaction of the sleeve 32 therewith.

One of the stub shafts 27 has affixed thereto a gear 34 which meshes with a gear 35 carried by the driving shaft 36 suitably supported by a side arm 14 of the member M. The shaft 36 is adapted to be driven in any suitable manner by a movable part of the cultivator or other machine to which my improved device is applied.

Each of the bearings 29 is pivotally engaged as at 34 with an arm 28 and diametrically opposed to such connection said bearing is provided with an arcuate slot 35 through which is disposed a clamping member 36. By this arrangement the bearing 29 may be readily adjusted to properly position the pin 30.

Pivotally engaged at 37 with the opposite faces of the head 22 are the elongated arms 38. The arms 38 have also disposed therethrough a clamping member 39 directed through a slot 40 in the head 22 so that the arms 38 may be adjusted forwardly or backwardly as the occasions of practice may necessitate.

Each of the members 38 terminates below the head 22 and has its lower end continued by the outwardly disposed and perpendicularly related extension 40. The outer extremity of the extension 40 is provided with an upstanding foot 41 to which is secured an end portion of a top plate 42. The opposite end portion of the top plate 42 is provided with an upstanding extension 43 adjustably connected with an arm 38 through the medium of the clamping member 44 disposed through a slot 45 in said extension 43.

Interposed between the extension 40 and the top plate 42 are the rollers 46 mounted upon the shafts 47. The extremities of the shafts 47 are secured to the side plates 48 whereby said side plates are capable of reciprocation longitudinally of the extension 41. By having the inner end portion of the top plate 42 adjustably connected with the arm 43, said top plate may be moved relative to the rollers 46 in order to facilitate the desired reciprocation of the side plates 48.

The plates 48 are connected by a transversely disposed plate 49, and interposed between said plate 49 and the foot 41 of the extension 40 is an expansible member 50 herein disclosed as a coil spring which constantly urges said side plates 48 inwardly.

Each of the plates 48 has depending therefrom a pair of spaced arms 51 provided with vertically disposed slots 52. Overlying the rear faces of the arms 51 are the upstanding brackets 53 carried by the elongated cutting member or knife 54 and which knife upon rocking of the member R engages the stalks of the plants to be cut or chopped at a point between the slide 1 and the cutting member 8.

Each pair of side plates 48 adjacent their outer ends has secured thereto an upstanding bracket 55 which rotatably supports a roller 56 revolving about a vertical axis, and said roller 56 is adapted to be engaged by an elongated spring member 57 positioned inwardly of the roller. Said spring 57 is horizontally disposed and inclined in a direction toward the roller 55 so that the same may be caused to contact with said roller 55 to move the plate 48 outwardly.

Each of the springs 57, carried by the slide 58, substantially rectangular in form, is supported by the vertically disposed frames 59 depending from an outstanding foot 60 arranged at the lower end portion of an arm 61. The frames 59 rotatably support the rollers 62 arranged within the slide 58 and which facilitates the reciprocal movement of said slide. The inner end portion of each of the slides 58 has pivotally engaged therewith a link 63 which is pivotally engaged with the lower end portion of a vertically disposed lever 64.

Each of the levers 64 is supported substantially midway its length by a side arm 14 of the member M for swinging movement in the path of travel of the device so that each of the cutting blades 54 may be readily positioned relative to the plant as required.

The forward lever 64 below but in close proximity to its pivotal mounting is provided with an inwardly directed cam edge 65 with which is adapted to engage a rock arm 66 carried by the adjacent stub shaft 36 so that the forward lever 64 will be automatically swung outwardly at predetermined intervals and the arm 66 is so positioned relative to the cam edge 65 as to impart outward swinging movement to the lever L substantially during the period when the coacting cutting blade 54 is in contact with the plant, so that as the device advances the knife 54 will not have a tendency to pull the plant from the ground.

In practice it is preferred that the foot F be at the left side of a cultivator and as the cultivator advances the connected shafts 27 are rotated with the result that the pin 30 will impart oscillation to the rocking member R so that the requisite coaction of the cutting blades 54 may be had with the slide 1 and the cutting member 10 arranged above said slide. The oscillations of the member R will be substantially regular so that the cotton plants or the like can be blocked out as desired. In the event, however, it should be desired to avoid or detach a stalk, it is only necessary to impose the requisite pull upon the desired lever 64 which will result in an outward movement of the corresponding cutting blade 54. The extended outward movement of this cutting blade will depend upon the particular conditions.

It often occurs that when a knife 54 is about to effect a cutting operation there is no stalk to be severed, and in which event the next adjacent stalk may be covered by pulling or pushing one of the levers 64. It will also be self evident that by pushing or pulling either one of the levers 64, or both, the space between the knives 54 may be adjusted as preferred.

It is also to be particularly noted that the adjustable connections of the various parts permits the device to be readily adjustable to fully meet the various conditions of practice, and as these various adjustments are believed to be obvious to one skilled in the art to which my invention appertains, a detailed reference thereto is believed to be unnecessary.

From the foregoing description, it is thought to be obvious that a cotton chopper constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A cotton chopper comprising two relatively movable members, means for moving one of said members toward the other, and means for imparting independent movement to said member in a direction along the cutting edge of the second member.

2. A cotton chopper comprising two elongated cutting members movable one relative to the other, means for imparting movement to one of said members toward and from the second member, and means for reciprocating the first named member in a direction longitudinally of the second member.

3. A cotton chopper comprising two elongated cutting members movable one relative to the other, means for imparting movement to one of said members toward and from the second member, means for reciprocating the first named member in a direction longitudinally of the second member, and means for constantly urging the first named cutting member toward its frame movement in one direction.

4. A cotton chopper comprising, in combination, a support, an elongated cutting member engaged with said support, a frame engaged with the support and held beyond a side thereof, a second cutting member carried by said frame and movable toward and from the first named cutting member.

5. A cotton chopper comprising, in combination, a support, a cutting member engaged directly therewith, a frame carried by said support to one side thereof, a rock member carried by the frame, a second cutting member carried by the rock member and coacting with the first named cutting member, and means carried by the frame for oscillating the rock member toward and from the first named cutting member.

6. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, and means for imparting movement to said cutting member in one direction.

7. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, means for imparting movement to said cutting member in one direction, and means for constantly urging said cutting member in an opposite direction.

8. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, means for imparting movement to said cutting member in one direction, and automatic means for imparting movement to said cutting member in one direction.

9. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, means for imparting movement to said cutting member in one direction, and means operated by the means for oscillating the rock member for automatically moving said second named cutting member in one direction at substantially right angles to its path of oscillation.

10. A cotton chopper comprising, in combination, a support, a slide secured to said support for contact with the ground, a cutting member carried by the slide, and a second cutting member carried by the support independently of the slide for movement toward and from the first named cutting member.

11. A cotton chopper comprising, in combination, a support, a slide secured to said support for contact with the ground, a cutting member carried by the slide, and a second cutting member carried by the support for movement toward and from the first named cutting member, the cutting member carried by the slide being adjustable relative thereto.

12. A cotton chopper comprising in combination, a support, a cutting member carried directly by the support, a vertically disposed frame held by the support and positioned to one side thereof, a cutting member carried by said frame for movement toward and from the first named cutting member, said second named cutting member being movable in a direction angular to the path of oscillation, a member carried by the frame and reciprocating in the same general direction as the second named cutting member, said last named member and the second named cutting member being provided with coacting means whereby movement of said last named member in one direction imparts movement to the second named cutting member in a similar direction, and means for constantly urging the second named cutting member in the opposite direction.

13. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, and means carried by the frame for imparting movement to said cutting member in one direction.

14. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, and a lever supported by the frame for rocking movement and engageable with the cutting member carried by the frame for imparting movement to said cutting member in one direction.

15. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, a lever supported by the frame for rocking movement, and an elongated member coacting with the lever for engagement with the cutting member carried by the frame for imparting movement to said cutting member upon movement of the lever in one direction.

16. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, a lever supported by the frame for rocking movement, and an elongated member coacting with the lever for engagement with the cutting member carried by the frame for imparting movement to said cutting member upon movement of the lever in one direction, said elongated member being resilient.

17. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, a slide carried by the frame and movable in the same general direction as the cutting member carried by the frame, a member carried by the slide and engageable with said cutting member for imparting movement to said cutting member upon movement of the slide in one direction, and means for imparting movement to the slide.

18. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, a lever supported by the frame for rocking movement and engageable with the cutting member carried by the frame for imparting movement to said cutting member in one direction, and means for imparting movement to the lever.

19. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, a lever supported by the frame for rocking movement and engageable with the cutting member carried by the frame for imparting movement to said cutting member in one direction, said lever being provided with a cam, and a movable member engageable with said cam for imparting movement to the lever.

20. A cotton chopper comprising, in combination, a support, a cutting member engaged directly therewith, a frame carried by said support to one side thereof, a rock member carried by the frame, a second cutting member carried by the rock member and coacting with the first named cutting member, means carried by the frame for oscillating the rock member toward and from the first named cutting member, the cutting member carried by the frame being movable in a direction substantially at right angles to its path of oscillation, a lever supported by the frame for rocking movement and engageable with the cutting member carried by the frame for imparting movement to said cutting member in one direction, said lever being provided with a cam, and a movable member engageable with said cam for imparting movement to the lever, said member being comprised in the means for oscillating the rock member.

In testimony whereof I hereunto affix my signature in the presence of two witnesses.

WILLIAM L. DAWSON.

Witnesses:
  R. O. OWENS,
  NIMMIE BELLE DAWSON.